Inventor
Joseph F. Novak
By M. F. Kellogg
Atty.

Inventor
Joseph F. Novak
By M. F. Kellogg, Atty.

United States Patent Office 3,298,571
Patented Jan. 17, 1967

3,298,571
AUTOMATICALLY ACTUATED FLUID PRESSURE TRIGGERING AND DISCHARGE VALVE
Joseph F. Novak, 609 State St., Calumet City, Ill. 60409
Filed Feb. 14, 1963, Ser. No. 258,558
11 Claims. (Cl. 222—5)

This invention relates to improvements in automatically actuated or triggering devices advantageously adaptable for installation in those types of valves employed in or on inflatable bodies or mechanical motion generating and transmitting devices whereby they will be inflated or activated at certain predetermined times and under certain predetermined conditions.

It is an object of the invention to provide a device which when operatively associated with a container of compressed air, gas or other fluid, will be automatically activated when in the presence of a predetermined amount or quantity of moisture (air, water, etc.) in a manner to effect puncturing or opening of the container whereby to permit discharge of its contents and the utilization thereof for inflating a body equipped therewith, or for actuating certain motion transmitting leverage or linkage communicating therewith.

Another and important object of the invention is to provide a device including motion generating and transmitting means adapted to be retained in an "at ready" position by a moisture disintegrable or soluble element which, when subjected to moisture (air, water, etc.) will disintegrate or dissolve and in so doing, will activatively trigger said means.

It is also an object of the invention to provide a device of the character stated housing an advantageous and novel form of motion generating and transmitting means which, when actuated, will translate the transmitted motion in a maner whereby its delivered impact force will be greater than that initially generated and imparted thereto.

Yet another object of the invention is to provide a device of such construction and design as will permit the motion generating and transmitting mechanism thereof to be conveniently and easily adjusted to its "at ready" position and to be positively retained in such position until triggered, thus, assuring inherent factors and/or properties of dependability, operability and safety.

The foregoing, as well as other objects, advantages and meritorious teachings of my invention will be in part obvious and in part pointed out in the following described disclosure thereof, when taken in conjunction with the accompanying drawings, it being understood that the form of invention presented herein is precise and what is now considered to be the better mode of embodying its principles, but that other and further modifications and changes may be made in specific embodiment without departing from its essential features.

Figure 1:
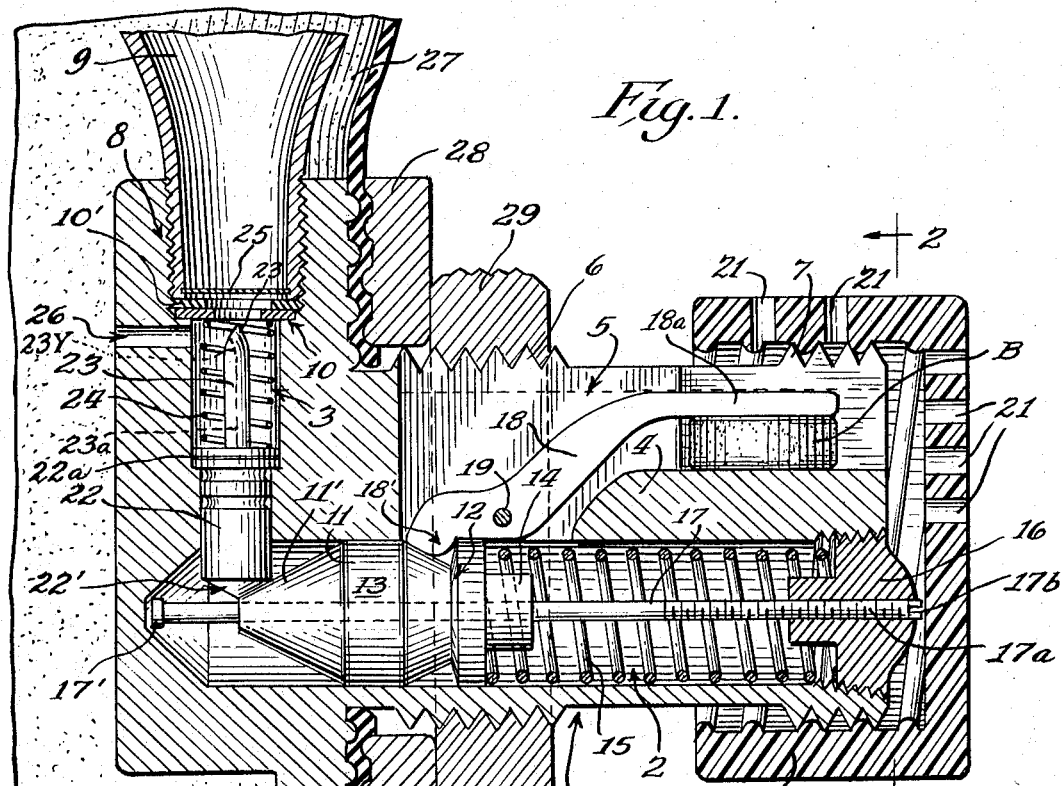
FIGURE 1 is a longitudinal section through the improved valve triggering or control device in "at ready" position wherein it is shown installed upon an inflatable body and provided with a compressed air, gas, etc. container, the body and the container being fragmentally illustrated.
Figure 2:
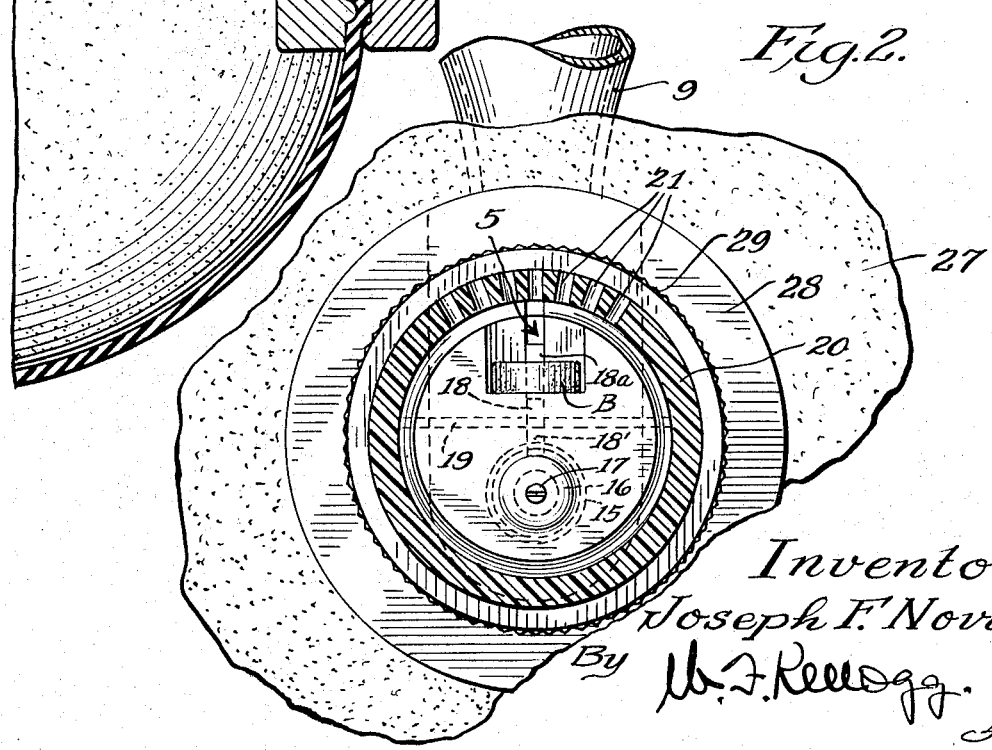
FIGURE 2 is a transverse section taken on the line 2—2 of FIGURE 1, looking in the direction in which the arrows point.
Figure 3:
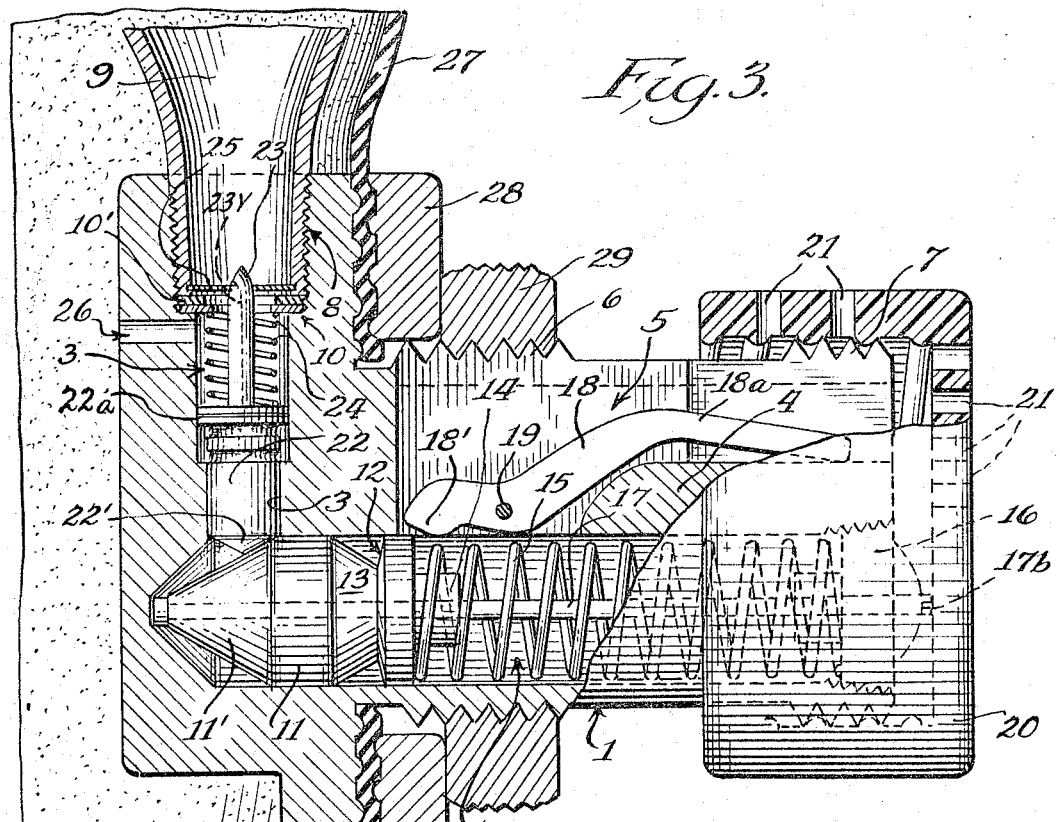
Figure 4:
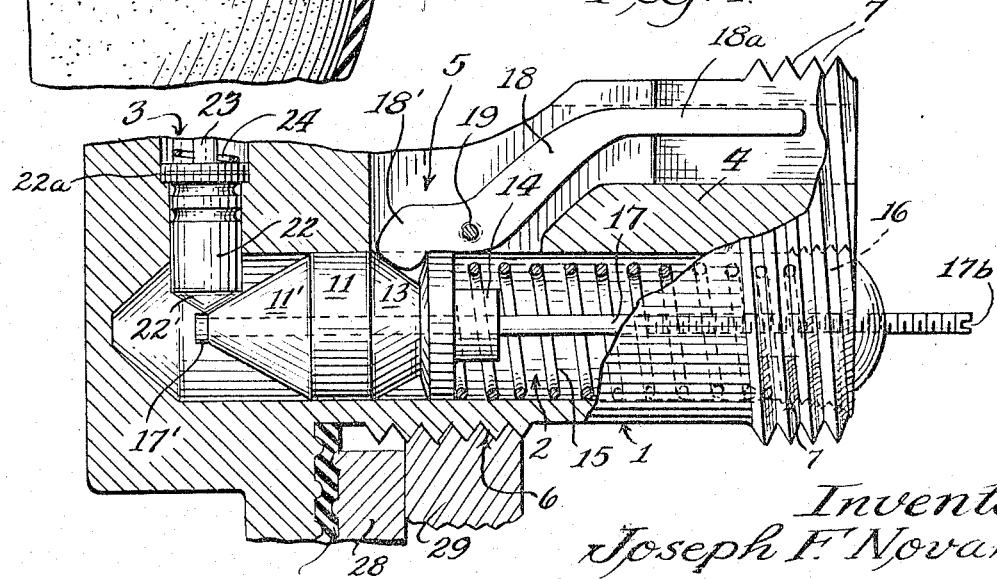

FIGURE 3 is a section similar to FIGURE 1, but wherein the triggering and motion transmitting mechanism is shown in a post triggered position with the container puncturing spike of the driven member engaged through the puncturable discharge end of the container and the detent or trigger in its released position, and FIGURE 4 is a fragmentary longitudinal section showing the ram resetting rod in a position following resetting of the ram and trigger to "at ready" positions and prior to its threaded turning to that position shown in FIGURE 1.

Referring in detail to the drawings, the invention comprises a housing 1 of substantially L-shaped form having a substantially right-angularly formed chamber or channel 2–3 in and longitudinally thereof; a shelf, wall or supporting surface 4 therein in proximity to the chamber leg 2, and a longitudinally disposed marginally opening slot or way 5 in the body thereof communicating with the shelf and the chamber leg 2. Portions of the body are externally screw threaded, as at 6 and 7, the purpose of which is hereinafter described.

The chamber leg 3, disposed at substantially right angles to the leg 2, is enlarged and internally threaded at its outer end portion, as at 8, whereby to threadedly receive the discharge end or neck of a container 9 normally charged with compressed air, gas, etc., while its inner end portion is reduced and shouldered, at 10, and opens into the adjacent end of the chamber leg 2. Preferably, a washer or gasket, or both, indicated by the numeral 10′, are seated on the shouldered portion 10, for an obvious purpose.

A ram member 11 is slideably received within the chamber leg 2. Its inner end is tapered, at 11′, as is the inner end of said leg 2. The outer end portion thereof is formed with a peripheral V-groove, one side of which is acutely shouldered, at 12, and its opposite side less acutely shouldered, as at 13, providing a more or less cam surface. A diameter reduced coaxially disposed tang 14 is carried by the outer end of the ram.

To normally impart inward longitudinal thrust of effective force to the ram, a coiled compression spring 15, of suitable tension, is received within the chamber leg 2 having its inner end engaged about the tang and bearing on the adjacent end of said ram. Its outer end has bearing on a closure 16 threadedly engaged in the outer open end of said chamber leg.

A rod 17 of length greater than the chamber leg 2 is axially and slideably engaged through the ram 11, having its inner end headed, as at 17′, its outer end portion screw threaded, at 17a and preferably kerfed, as at 17b. Said outer end portion is threadedly engaged through the closure 16.

In order that the ram 11 will be engaged and positively though releasably retained in its "at ready" position, as shown in FIGURE 1, an angularly formed detent or trigger 18 is received in and disposed longitudinally of the way 5 and pivotally mounted therein, as at 19, on the housing body. The inner end thereof is formed with a lip 18′ engageable, at times, in the peripheral V-groove 12–13 in the ram, and its outer end portion is offset and somewhat elongated, at 18a, to overlie the shelf 4.

When in its "at ready" 55 position, as described above, a disintegrable or soluble body B is received on the shelf 4 beneath and abuttingly engaged by the shelf overlying portion 18a of the detent 18. Thereby, positive engagement of the detent lip 18′ in the ram peripheral groove 12–13 is assured.

To substantially close the outer end of the body 1 and to protect the disintegrable or soluble body B, an internally screw threaded cap 20 is turned into engagement with the screw threaded end portion thereof, as shown in FIGURE 1. A plurality of perforations generally indicated by the numeral 21 are formed in the cap in proximity to the shelf supported disintegrable or soluble body B, thus permitting the ingress of moisture (air, water, etc.) thereto, plus covering the outer end of the closure 16 and the kerfed outer end of the ram resetting rod 17.

Referring now to the chamber leg 3 of the body 1, a piston-like driven member 22 having a sealing ring 22a thereon is slideably received therein. Its lower end is tapered as at 22', corresponding to the tapering 11' of the ram 11 and normally lying in bearing engagement or contact therewith, as shown in FIGURES 1 and 4 of the drawings. The remaining end of said driven member fixedly mounts a puncturing spike 23 thereon, the same being preferably coaxially disposed with relation to said member and having a sharpened free end and a longitudinally disposed channel 23' therein opening onto its pointed end. A coiled compression spring 24 is received within the chamber leg 3 about the spike 23, having one end bearing on the hereinbefore described washer 10' seated on the body shouldered portion 10. Thus, as respect to the showing in the figures of the accompanying drawings, a downward thrust will be normally imparted to the driven member causing it, with its tapered end 22', to bear upon and slideably contact with the tapered end portion 11' of the ram 11, retaining the puncturing spike 23 in non-engaging but "ready" position with respect to the puncturable or rupturable closure wall 25 in the neck of the container 9.

To permit discharge of compressed air, gas, etc. from the container 9, as and when its closure wall 25 is punctured by the spike 23, a discharge port 26 is formed in the housing 1 adjacent to and communicating with the chamber leg 3 inwardly of the shouldered portion 10 and beyond the mouth of the container 9.

It is to be here noted that the tension of the coiled compression spring 24 is considerably less than that of the compression spring 15; therefore, that the thrust of the latter will be greater than that of the former. Thus, as and when the ram 11 is thrust inwardly by the spring 15, the driven member 22, by reason of the delivered impact, will be driven upwardly in the chamber leg 3, compressing the coiled spring 24 and driving the puncturing spike 23 into and through the rupturable closure wall 25 in the neck of the container 9. Thus, compressed air, gas, etc. will flow from the container 9 through the channel 23' in the spike 23 to and through the discharge port 26 in the housing 1.

In the illustrated embodiment of the invention, that portion of the housing having the chamber leg 3 therein is received within an inflatable body 27, as is the container 9. It is secured in such relationship by engaging a clamping ring 28 over the body portion of the housing and moving it into clamping engagement with relation to adjacent portions of the inflatable body 27 by a jam or locking nut 29 turned onto the screw threaded portion 6 of said housing body.

In operation of the invention and assuming that it is installed in an inflatable body such as herein indicated by the numeral 27, the cap 20 is removed from the body portion of the housing 1. The rod 17 is rotated by engaging a suitable implement in its kerfed end 17b, causing it to be moved to that position shown in FIGURE 4. As the rod thus moves outwardly in the chamber leg 2, its headed end 17' engages the tapered extremity of the ram 11, moving it outwardly in said leg against the tension of the spring 15 until the lip 18' of the detent or trigger 18 engages in the peripheral groove 12–13 of the ram member 11. Thereby, the ram will be releasably locked in the position shown in FIGURES 1 and 4 of the drawings. At this time, a disintegrable or soluble body B is placed on the shelf 4 below the offset end 18a of the detent or trigger whereby to maintain the detent lip 18' in secure engagement in said ram peripheral groove 12–13. At such time, the driven member 22, having thrust imparted thereto by the coiled compression spring 24, will have its tapered extremity 22' bearingly engaged with the tapered extremity 11' of the ram 11; also, the puncturing spike 23 carried by said member will be in spaced relation to the closure wall 25 of the container 9.

With the ram 11 and the driven member 22 in the above described "at ready" position, the rod 17 is again engaged and rotated so as to return it to its initial position shown in FIGURE 1 of the drawings. Thereupon, the closure cap 20 is reengaged with the housing body end.

As and when a predetermined degree of moisture is admitted through the openings 21 of the closure cap 20 and engaged with the disintegrable or soluble body B, it will disintegrate or dissolve. Having dissolved, the thrust tension of the heavy coiled compression spring 15 will counter the retaining engagement of the lip 18' of the detent 18 in the peripheral groove 12–13 of the arm 11 and said ram will be moved with material force or thrust to the position shown in FIGURE 3 of the drawings. Thereby, and as hereinbefore stated, the impact of such thrust will drive the driven member 22 outwardly in the chamber leg 3, entering the puncturing spike 23 into and through the container 9 closure wall 25. The outflow of compressed air, gas, etc. from the container, plus the tension of the now compressed coiled spring 24 will cause the driven member to be maintained in bearing contact or engagement with the tapered extremity of the ram 11, allowing the compressed air, gas, etc. to flow from the container 9 through the channel 23' of the spike 23 into and through the discharge port 26 of the housing into the inflatable body 27.

Whereas I have hereinbefore described, with some degree of particularity, the adaptation of the invention to an inflatable body, it will be understood and appreciated that the invention may be as advantageously and beneficially adapted to various other devices whereby fluid under pressure will be delivered thereto for effecting operation of the same. Such a device may be a mechanism which when actuated by the fluid discharged thereinto will effect operation thereof for various purposes. In such an adaptation of the invention, it is to be understood that a pipe, tube or the like will be entered into and secured in communicating engagement with the discharge port 26 of the housing 1.

I claim:

1. A device of the character described comprising: a body having a substantially right angularly shaped chamber therein, a supporting wall adjacent one portion of said chamber, a pair of right angularly arranged motion transmitting means slidably received in said chamber with one of said means serving to actuate the other, a pair of biasing means respectively associated with said pair of motion transmitting means for urging the latter toward one another, a pivotly mounted trigger extending into said one portion of the chamber and engageable at times with said one motion transmitting means whereby to releasably lock the same against sliding movement, said trigger having a portion adapted for disposition in spaced relation to said wall for receiving a disintegrable element therebetween for releasably holding said trigger in said lock releasing position, means carried by said other motion transmitting means arranged in said chamber for puncturing a member when said other motion transmitting means is engaged and actuated by said one motion transmitting means, and means for manually screw retracting said one motion transmitting means against the force exerted by its spring urged ram to a position for locking engagement with said trigger, said other motion transmitting means with said puncturing means returnable by its spring means to its initial position when said one motion transmitting means is locked in said retracted position.

2. A device of the character described comprising: a body having a pair of substantially right angularly formed intersecting chambers, a supporting surface provided adjacent one of said chambers, a spring urged ram slidable in said one chamber, a driven member disposed in said other chamber at substantially right angles to said ram and being slidable in one direction in response to engagement and actuation by said ram, a pivotly mounted trigger extending into said chamber for releasably engaging and retaining said ram against actuating said member, said trigger having a portion disposed in opposed relation to said supporting surface for receiving a disintegrable element therebetween whereby the latter serves to releasably hold said trigger in locked relation to said ram, means carried by said driven member for puncturing a member when moved in said one direction by said ram when the trigger is released upon disintegration of said element, and spring means for automatically returning said driven member to its initial position when said ram is locked in position by said trigger.

3. A device of the character described comprising: a body having a pair of substantially right angularly formed intersecting chambers, a supporting wall provided adjacent one of said chambers, a spring urged member provided with puncturing means disposed in the other chamber, a spring urged ram disposed in said one chamber at right angles to said member and having a tapered inner end for engaging and driving said member in one direction, a pivotly mounted trigger extending into said one chamber for releasably engaging and locking said ram in a retracted position, said trigger having a portion disposed in opposed relation to said wall for receiving a disintegrable element therebetween for releasably holding said trigger in locking relation with said ram, and elongate means slidably engaged through said ram whereby the latter may be manually screw retracted so that said trigger can be moved to its locking position to maintain the ram retracted, after which elongate means is manually screwed back down to its initial position, said driven member being returnable to its initial position by its spring when said ram is locked in its retracted position.

4. The device defined in claim 2, in which said ram and driven member are always engaged after puncturing said member, and said body is provided with a passage communicatively connected with said other chamber through which a fluid may be dispensed.

5. The device defined in claim 2, in which said body is provided with a passage communicating with said other chamber and said puncturing means is provided with a slot whereby to facilitate entry of a fluid into said other chamber for transmission laterally thereof through said passage.

6. The device defined in claim 2, in which said ram is provided with a groove for receiving the trigger and said elongate means comprises a rod, slidably engaged through said ram.

7. The device defined in claim 1, in which said body is provided with an internally threaded portion and an apertured internally and externally threaded part which threadedly engages said threaded portion, and said manually screw retracting means is elongate and extends through said internally threaded aperture for screw retracting said ram.

8. The device defined in claim 3, in which said body is provided with an internally threaded portion and an externally threaded part is threadedly connected to said threaded portion and provided with an internally threaded aperture, and said elongate means has a portion slidably engaged through said ram its inner end headed and a outer threaded portion which extends through and screw engages said internally threaded aperture in a manner whereby said elongate means may be screwed to a position to retract said ram.

9. The device defined in claim 3, in which said trigger is provided with means whereby to facilitate its manipulation when there is a void between said wall and said trigger.

10. The device defined in claim 3, in which said body is provided with an externally threaded portion and an internally threaded cap is threadedly connected to said threaded portion and is provided with an opening through which fluid may flow over that end of the body in proximity to the said wall.

11. The device defined in claim 3, in which elongate means is axially and slidably engaged through said ram, with its inner end headed and outer end externally threaded and of a length greater than said one chamber.

References Cited by the Examiner
UNITED STATES PATENTS
2,684,784  7/1954  Fox _____ 222—5

FOREIGN PATENTS
588,284  12/1959  Canada.

ROBERT B. REEVES, *Primary Examiner.*

RAPHAEL M. LUPO, LOUIS J. DEMBO, *Examiners.*

N. L. STACK, *Assistant Examiner.*

UNITED STATES PATENT OFFICE
CERTIFICATE OF CORRECTION

Patent No. 3,298,571      Dated January 17, 1967

Inventor(s) JOSEPH F. NOVAK

It is certified that error appears in the above-identified patent and that said Letters Patent are hereby corrected as shown below:

Column 4, line 56, for "lock" read -- locking --; delete "releasing"; line 62, for "spring urged ram" read -- biasing means --; line 64, between "means" and "returnable" insert -- being --; line 65, for "spring" read -- biasing --.

Column 5, line 1, between "said" and "chamber" insert -- one --; line 8, before "member" insert -- puncturable --; line 30, between "which" and "elongate" insert -- said --; line 36, between "said" and "member" insert -- puncturable --; line 45, change "2" to -- 3 --.

Column 6, line 15, between "ram" and "its" insert -- with --; line 31, between "which" and "elongate" insert -- said --; line 33, between "and" and "outer" insert -- its --.

Signed and sealed this 28th day of November 1972.

(SEAL)
Attest:

EDWARD M. FLETCHER, JR.
Attesting Officer

ROBERT GOTTSCHALK
Commissioner of Patent